United States Patent Office 2,794,110
Patented May 28, 1957

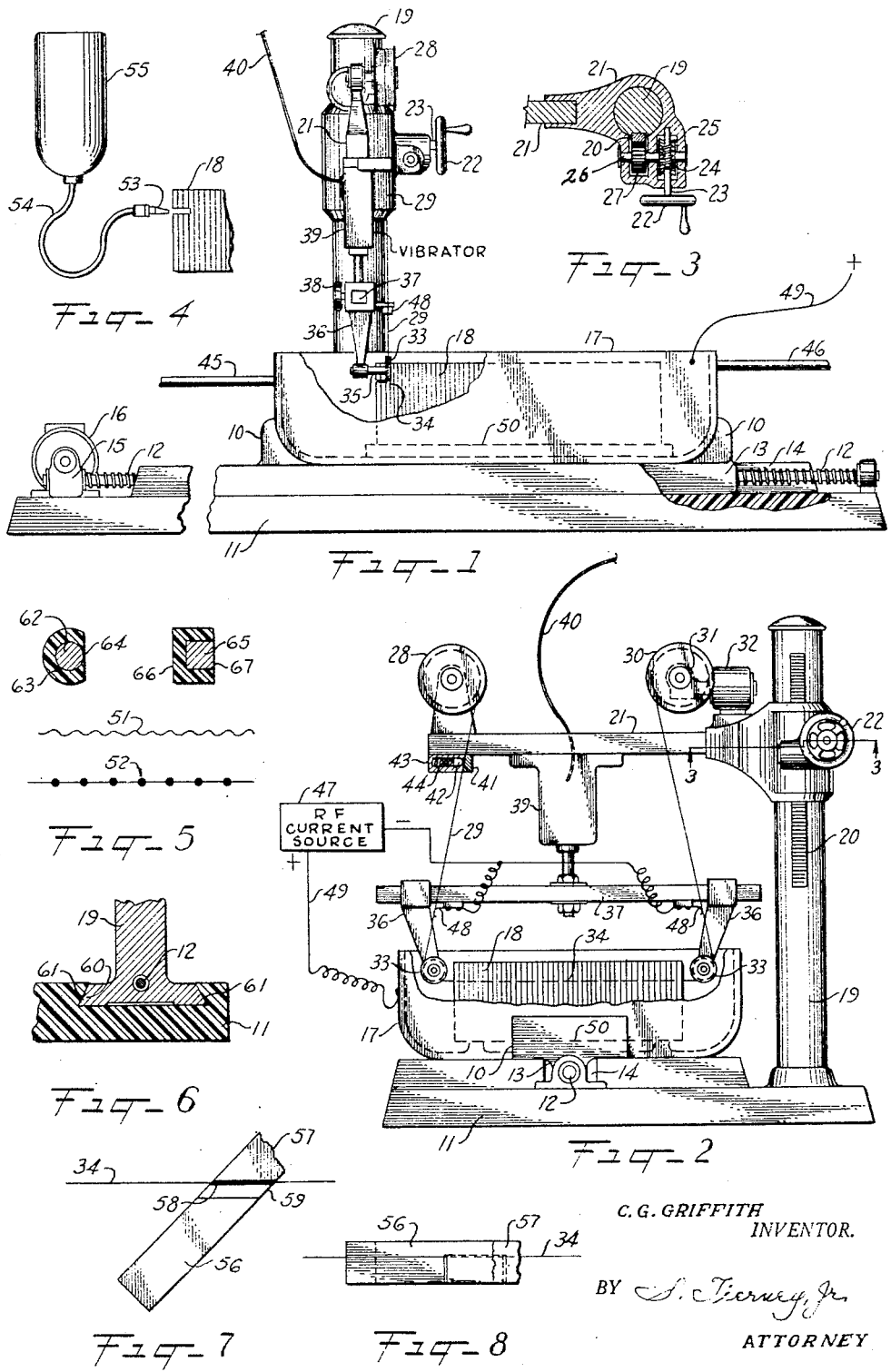

2,794,110

METHOD AND MEANS FOR REMOVING METAL BY ELECTRIC DISCHARGES

Charles G. Griffith, San Diego, Calif., assignor to Rohr Aircraft Corporation, Chula Vista, Calif., a corporation of California Application May 6, 1955, Serial No. 506,503

10 Claims. (Cl. 219—69)

This invention relates to a method and means for cutting a metal workpiece by means of a succession of small electrical discharges between a wire and the workpiece.

An object of the invention is to remove metal quickly from a workpiece by means of a series of electric discharges proceeding from a thin wire moving along a path in the workpiece.

Another object is to cut one or more thin slots in a metal workpiece by means of a succession of electric discharges from a thin wire.

A further object is to provide for the cooling of such a wire by vibrating it while the electric discharges are passing thereby causing a thicker slot to be cut in the metal, such a slot permitting the passage of coolant fluid to the wire and the region of the workpiece tending to be heated by the discharges.

Another object is to provide for the replacement of the portion of the wire which is gradually consumed by the discharges by a feeding device which feeds the wire lengthwise at a slow rate.

A further object is to provide a method for forming a smooth cutting edge on a metal-cutting tool by electrically removing a thin strip of metal therefrom by a succession of small electrical discharges from a thin wire movable along the edge.

Further objects will become apparent as the description of the device proceeds. For a better understanding of the invention, reference is made to the accompanying drawing, in which:

Fig. 1 is a front view of a machine embodying the invention, parts being broken away;

Fig. 2 is a side view of the machine of Fig. 1, parts being broken away, also showing a wire tensioner in section;

Fig. 3 is a sectional view of the operating gearing taken on line 3—3 of Fig. 2;

Fig. 4 shows an alternative means for cooling the electrode and work;

Fig. 5 shows alternative shapes of wire electrodes which may be used;

Fig. 6 is a sectional view of portions of a modified form of invention;

Fig. 7 is a front view of a lathe or planer cutting tool and a wire electrode and;

Fig. 8 is a top view of the tool and electrode of Fig. 7.

Referring to Figs. 1 and 2 a carriage 10 is slidable in a straight path along a rigid supporting base 11 made of Bakelite or other insulating material, the carriage being advanced or retracted by a feed screw 12 which engages a threaded lug 13 depending from carriage 10 into a central slot 14 in the top of base 11. Screw 12 is rotated in either direction by a gear reducer 15 driven by a reversible electric motor 16 whose speed may be regulated by any known type of electrical control means (not shown). Mounted on carriage 10 is a work-supporting metal trough 17 to which is attached by any suitable means (not shown) the workpiece 18 illustrated as a metal honeycomb panel with the cell walls vertical.

At one side base 11 carries a generally cylindrical column 19 having attached thereto a stationary rack 20 and slidable along the column is a platform 21 which may be raised or lowered by turning a handwheel 22. Wheel 22 is attached to the end of a shaft 23 which carries a worm 24 which meshes with worm gear 25 attached to a shaft 26. Shaft 26 also carries a spur gear 27 which meshes with the teeth of rack 20 so that by rotating hand wheel 22 the platform 21 may be raised or lowered to any desired level.

Platform 21 has a rotatable feed reel 28 on which a coil of thin flexible wire 29 is wound, the wire being slowly wound onto a take-up reel 30. Reel 30 is rotated by a gear reducer 31 (Fig. 2) driven by an electric motor 32. The wire passes over a pair of idler rolls 33 to provide a straight stretch 34 which is preferably horizontal and parallel to the upper face of base 11. Rolls 33 are pivoted on pins 35 attached to a pair of brackets 36 which are adjustable along a bar 37 and may be locked thereto by thumb screws 38. The length of straight stretch 34 may thus be adjusted to suit the width of workpiece 18. Bar 37 is normally stationary but may be vibrated in a vertical plane by an electrical vibrator 39 when energized by alternating current supplied through cable 40. A suitable tensioning device is provided to maintain the wire under a predetermined tension, that shown comprising a block 41 against which the wire is pressed by a plunger 42 slidable in a slot in a member 43, the plunger being biased against the wire by a spring 44. Block 41 and member 43 are attached to platform 21 by screws (not shown). A coolant dielectric liquid such as oil is circulated through trough 17, the liquid being supplied from a tank (not shown) through a flexible hose 45 and leaving the opposite end of the trough through a hose 46 which returns it to the tank. A source 47 of unidirectional radio frequency current has its negative terminal connected to a pair of flexible brushes 48 which bear against wire 29 and a flexible lead 49 connects the positive terminal to trough 17. The wire 29 is preferably of soft brass of a diameter within the range of .002 to .020 inch and the smaller wire is vibrated through an amplitude of about .018 inch while the larger wire may be vibrated through about .040 inch.

To operate the machine the honeycomb panel 18 is placed in and secured to trough 17 and handwheel 22 rotated to raise or lower platform 21 and bring the straight wire stretch 34 the proper distance above the bottom face 50 of the panel. Liquid is passed through hose 45 to cover panel 18, motor 32 started and current source 47 turned on. Motor 16 is then started to move carriage 10 toward the left in Fig. 1. As the edge of panel 18 gets close to wire stretch 34, the very rapid succession of unidirectional current discharges heat molecules at the end of the panel to the point of vaporization. These have a positive charge and are attracted toward the negative wire. As the detached molecules pass towards the wire they are carried away by the circulating coolant liquid. This process continues, the wire advancing in the narrow channel made in the panel by the detachment of the molecules. If the panel is short, the channel may be thick enough to permit the coolant liquid to reach and cool the wire without vibrating the wire; in which case the current to vibrator 39 may be shut off. In other cases when the panel is longer, a thicker channel is necessary to provide free flow of the coolant liquid to the wire. This is secured by operating the vibrator 39. When the wire has passed through the panel, a thin strip has been severed from the panel leaving its top face plane and parallel to bottom face 50. During the process the wire does not touch the panel and since the panel itself is not heated, no internal strains are set up in it nor is its grain structure changed. When the cut is finished, the several motors are stopped and the finished panel removed from trough 17. The wire is slowly consumed as it passes through the panel but due to the rotation of take-up reel 30, fresh portions are continually advanced into the active stretch 34 so that breakage of the wire is avoided.

While the wire 29 has been illustrated as of the conventional type, it may have shallow waves formed therein as shown at 51 (Fig. 5). The waves lie in a horizontal plane as the wire passes through the panel and help to promote the circulation of coolant liquid in the channel cut in the panel. An alternative construction is to have beads formed on the wire at regular intervals as indicated at 52, Fig. 5.

Instead of having oil in trough 17 to insulate the wire from the workpiece, the wire may be partly surrounded by insulation. Fig. 5 shows on an enlarged scale a wire having a core 62 of circular cross section partly surrounded by a tube 63 of flexible plastic insulation leaving an exposed core area 64 adjacent to workpiece 18 so that the electric discharges pass between this area and the workpiece. Or the core may be of square cross section as indicated at 65 and the plastic insulation 66 may be U shaped leaving one edge 67 of the core exposed to the spark discharges. In either case the wire may be cooled in a manner to be later described.

Instead of having the workpiece immersed in liquid in trough 17, the wire and workpiece may be cooled by a slow stream of liquid or gas coming from a suitable nozzle 53, Fig. 4. Nozzle 53 is connected by a flexible hose 54 to a tank 55 containing the liquid or gas. Air or carbon dioxide under pressure have been found suitable. If liquid carbon dioxide is used, its rapid expansion as it turns to a gas upon leaving the nozzle causes the gas to reach a temperature below 32° F. and keep the wire and workpiece cold in the presence of the minute electrical discharges.

Referring to Fig. 6, instead of the screw 12 advancing workpiece 18 toward wire 29, the workpiece and trough 17 may remain stationary and screw 12 be threaded into column 19 near its base. In this case the end of column 19 terminates in projecting flanges 60 which are slidable in straight mating guideways 61 formed in supporting base 11, as illustrated. The wire 29 is thus advanced through the workpiece.

Figs. 7 and 8 show another application of the invention in which a steel lathe or planer tool 56 has a broken end or tip 57 made of a very hard material as, for example, tungsten carbide. The tool is attached by a suitable clamp (not shown) in trough 17 and upon operation of the machine as above described, the broken end 57 may be served by the electrical discharges from wire 29 to the tool to form a plane smooth edge 58 on carbide tip 57 which has the desired relief or clearance angle with the face 59 which first enters the member being cut when the tool is in use. It is found that the electric discharges will sever the broken tip irrespective of the hardness of the metal and, since no force is applied nor the tool heated, its grain structure is not changed during the sharpening operation. It will be understood that the cooling of the tool may be done by a compressed gas in the manner above described instead of a liquid.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. Means for electrically cutting a narrow deep slot in a workpiece comprising, in combination: a pair of supporting frames, one of said frames having a large horizontal face arranged to support the workpiece; a thin wire supported by the other of said frames adjacent to the workpiece; means for slowly moving one of said frames toward the other frame to cause the wire to continually advance within the workpiece without touching it; means for continually conducting to the wire and workpiece unidirectional high frequency currents of amplitude sufficient to cause intermittent electrical discharges between the wire and workpiece as the wire advances within the workpiece; and means constructed and arranged to rapidly vibrate the wire through a small distance in a direction normal to the plane of the slot as the wire advances within the workpiece.

2. Means for electrically cutting a narrow deep slot in a workpiece comprising, in combination: a pair of supporting frames, one of said frames having a large horizontal face arranged to support the workpiece; a thin wire supported by the other of said frames adjacent to the workpiece, said wire having a series of waves formed therein; means for slowly moving one of said frames toward the other frame to cause said wire to continually advance within the workpiece without touching it; means for continually conducting to the wire and workpiece unidirectional high frequency currents of amplitude sufficient to cause intermittent electrical discharges between the wire and workpiece as the wire advances within the workpiece.

3. Means for electrically cutting a narrow deep slot in a workpiece comprising, in combination: a pair of supporting frames, one of said frames having a large horizontal face arranged to support the workpiece; a thin wire supported by the other of said frames adjacent to the workpiece, said wire having spaced apart integral portions which project beyond the main body portion thereof; means for slowly moving one of said frames toward the other frame to cause said wire to continually advance within the workpiece without touching it; means for continually conducting to the wire and workpiece unidirectional high frequency currents of amplitude sufficient to cause intermittent electrical discharges between the wire and workpiece as the wire advances within the workpiece.

4. Electrical means for removing a narrow strip from a workpiece comprising, in combination: a take-up reel; a feed reel; a thin wire wound around said reels and having a long substantially straight stretch disposed between said reels; power operated means constructed to continually advance the workpiece toward said straight stretch; means for rotating said take-up reel; and means for causing minute arcs to pass at radio frequency from successive portions of the wire in said straight stretch to the workpiece; and means for directing a coolant fluid against the portions of the wire composing said straight stretch.

5. Electrical means as claimed in claim 4, in which means is disposed adjacent said feed reel for maintaining the wire in said straight stretch continually under tension.

6. The method of electrically making a plane recess in a metal workpiece which comprises the steps of stretching a straight thin wire; vibrating the stretched wire in a direction normal to the plane of the recess; passing unidirectional currents of high frequency between the workpiece and wire to generate a sucession of arc discharges which remove minute particles from the region of the workpiece closely adjacent to the wire; continually advancing the workpiece toward the vibrating wire; and continually directing sufficient coolant fluid against the stretched wire to prevent any substantial rise in the temperature thereof.

7. Means for electrically cutting a portion from the top of a workpiece comprising, in combination: a main base; a vertical column attached to said base; a platform slidable along said column; means for adjusting said platform to any desired height on said column; a wire feed reel and a wire take-up reel mounted on said platform;

a substantially horizontal bar carried by said platform below said feed reel; a pair of spaced apart brackets depending from said bar, at least one of said brackets being adjustable to different positions along said bar; a pair of idler rolls pivotally supported at the lower ends of said brackets; a thin wire extending from said feed reel over said idler rolls to said take-up reel, the portion of said wire between said idler rolls forming a straight stretch disposed adjacent the top of the workpiece; means for slowly advancing the workpiece toward said straight wire stretch and concurrently conducting to the wire and workpiece high frequency currents of amplitude sufficient to cause intermittent electrical discharges between said straight wire stretch and the workpiece as said straight wire stretch advances within the workpiece.

8. Means for electrically removing a thin strip from the top of a metal workpiece comprising, in combination: a frame; a wire feed reel attached to said frame; a wire take-up reel attached to said frame; means for rotating said take-up reel; a thin wire wrapped around said reels; a vibrator secured to said frame and extending downwardly therefrom; a bar attached to said vibrator; a pair of rollers connected to said bar in spaced apart positions, said rollers being arranged to support a substantially straight stretch of said wire in a horizontal position closely adjacent the workpiece; a source of unidirectional electrical current of radio frequency connected to the workpiece and the wire to cause a succession of minute arc discharges to pass between said straight wire stretch and the workpiece; means for slowly advancing the workpiece toward said straight horizontal wire stretch; and means for continually directing a coolant fluid to said straight wire stretch and the region of the workpiece immediately adjacent thereto.

9. Means for cutting away the top of a honeycomb panel having vertical cell walls to provide a vertical surface thereon comprising, in combination: an open metal trough adapted to hold a pool of fluid, the bottom face of the panel resting on the bottom of said trough and the ends and sides of the panel being spaced from the ends and sides of the trough; a thin wire having a horizontal straight stretch disposed in the trough and closely adjacent one end of the panel slightly below the top thereof; a source of high frequency electrical current connected to said wire and trough to cause a series of high frequency electrical discharges to pass between the straight wire stretch and panel; a coolant fluid filling said trough to a level above said straight wire stretch; and means for continually advancing said trough to advance the end of the panel toward the straight stretch and to cause the panel to pass under the straight stretch as the electrical discharges remove metal particles from the top of the panel.

10. The method of cutting a thin slice from the top of a metallic honeycomb panel having vertical cell walls comprising the steps of placing the panel in a trough; directing a straight horizontal stretch of thin wire across said trough adjacent one end of said panel; filling the trough with a coolant fluid to a level slightly above said stretch of wire; passing unidirectional radio frequency electrical current between the wire and the honeycomb panel to cause a series of electrical discharges to pass between the wire and the panel which remove minute particles from the regions of the honeycomb panel closely adjacent the wire; and slowly moving the honeycomb panel toward said stretch of wire until the slice is cut from the panel.

References Cited in the file of this patent

UNITED STATES PATENTS

| Re. 20,035 | Strobel | July 14, 1936 |
| 1,441,685 | Jones | Jan. 9, 1923 |
| 2,319,401 | Hebeler | May 18, 1943 |
| 2,383,382 | Harding | Aug. 21, 1945 |
| 2,526,423 | Rudorff | Oct. 17, 1950 |

FOREIGN PATENTS

| 345,941 | Great Britain | Mar. 24, 1931 |